June 10, 1952  P. F. HURT  2,599,555
AIRCRAFT ROCKET LAUNCHER
Filed March 11, 1946  5 Sheets-Sheet 2
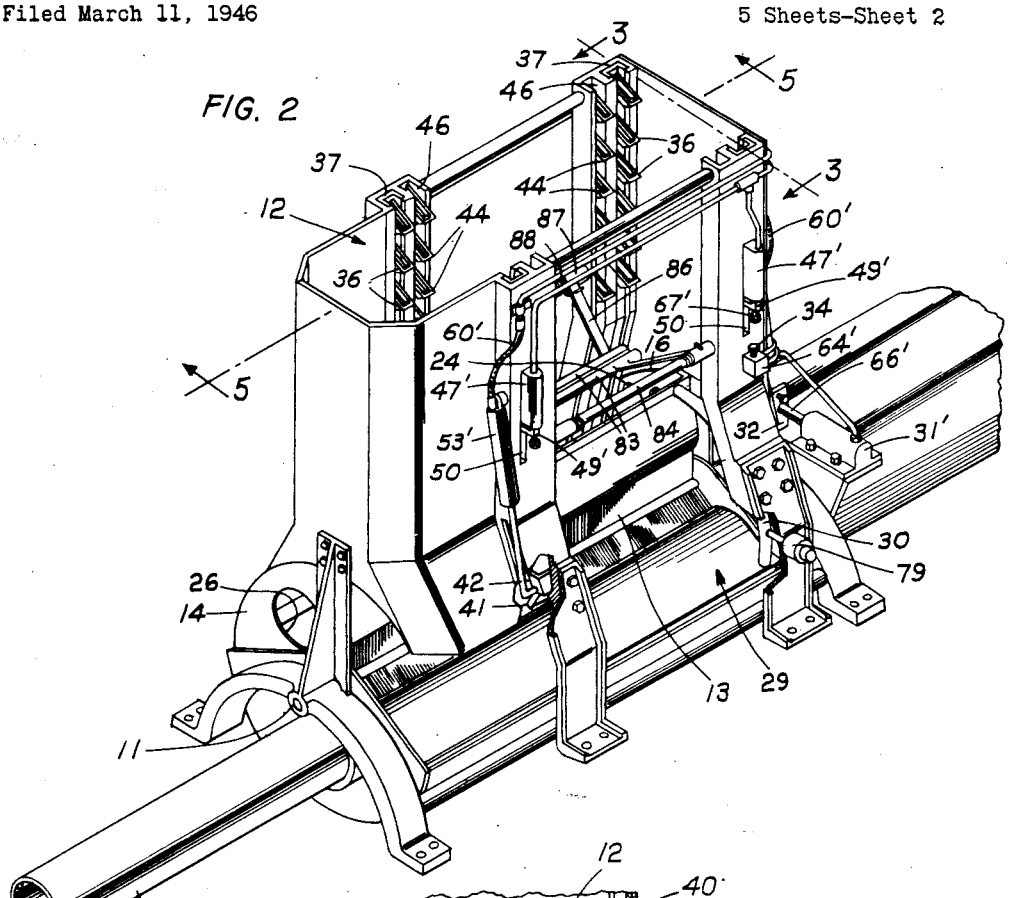
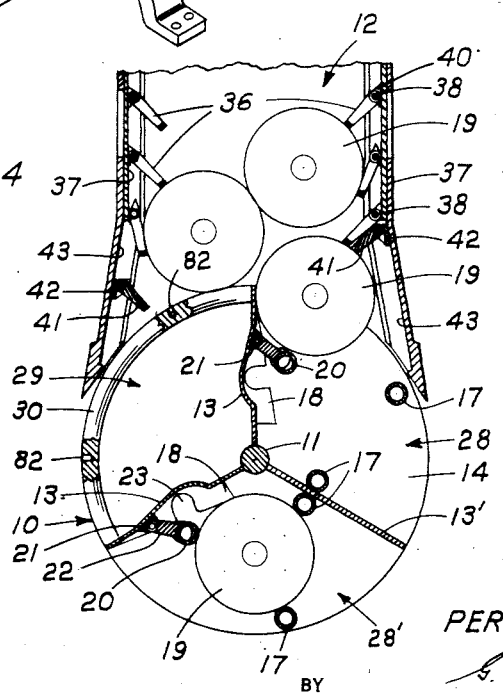
INVENTOR
PERCY F. HURT
BY
ATTORNEY

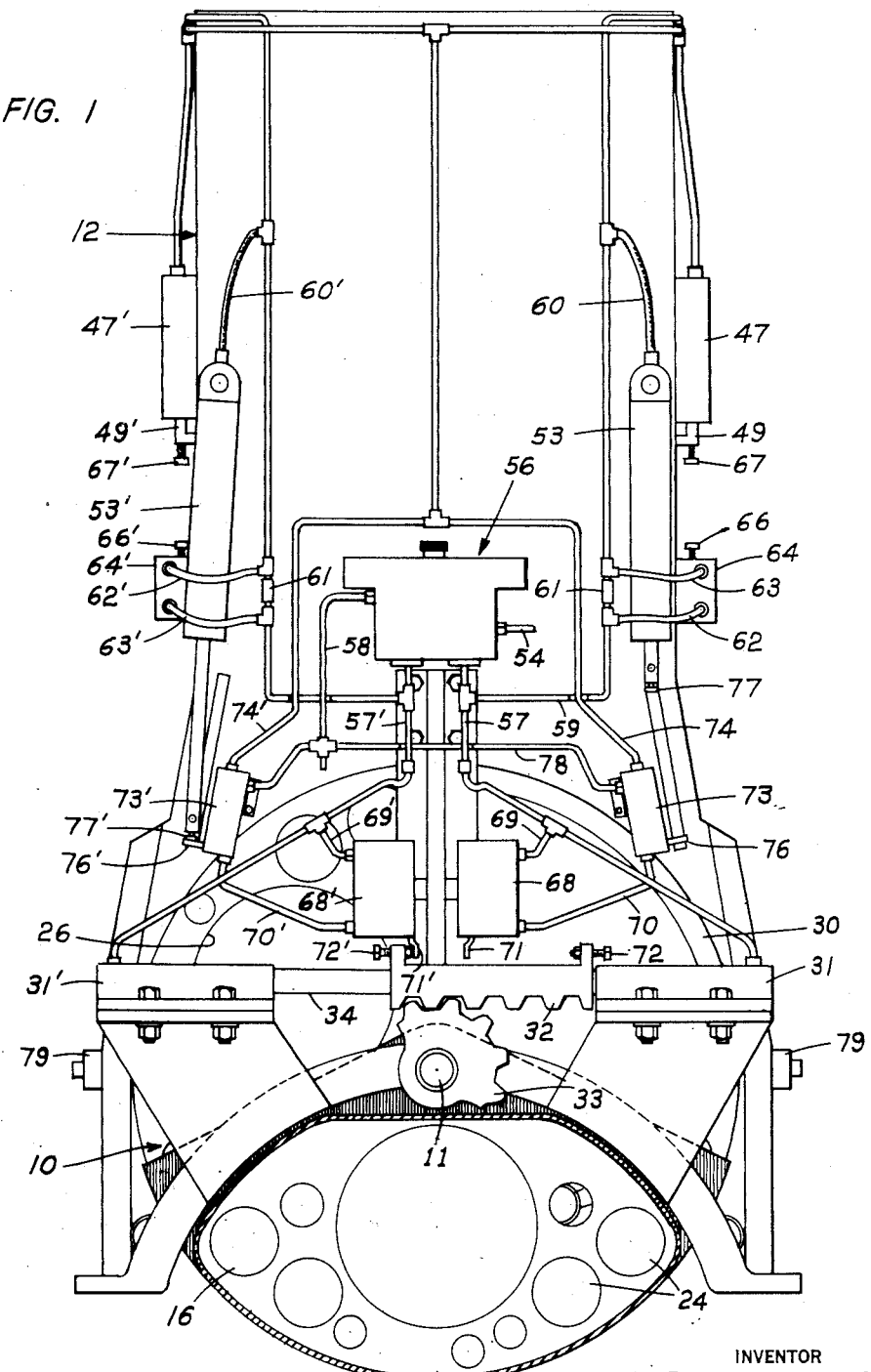

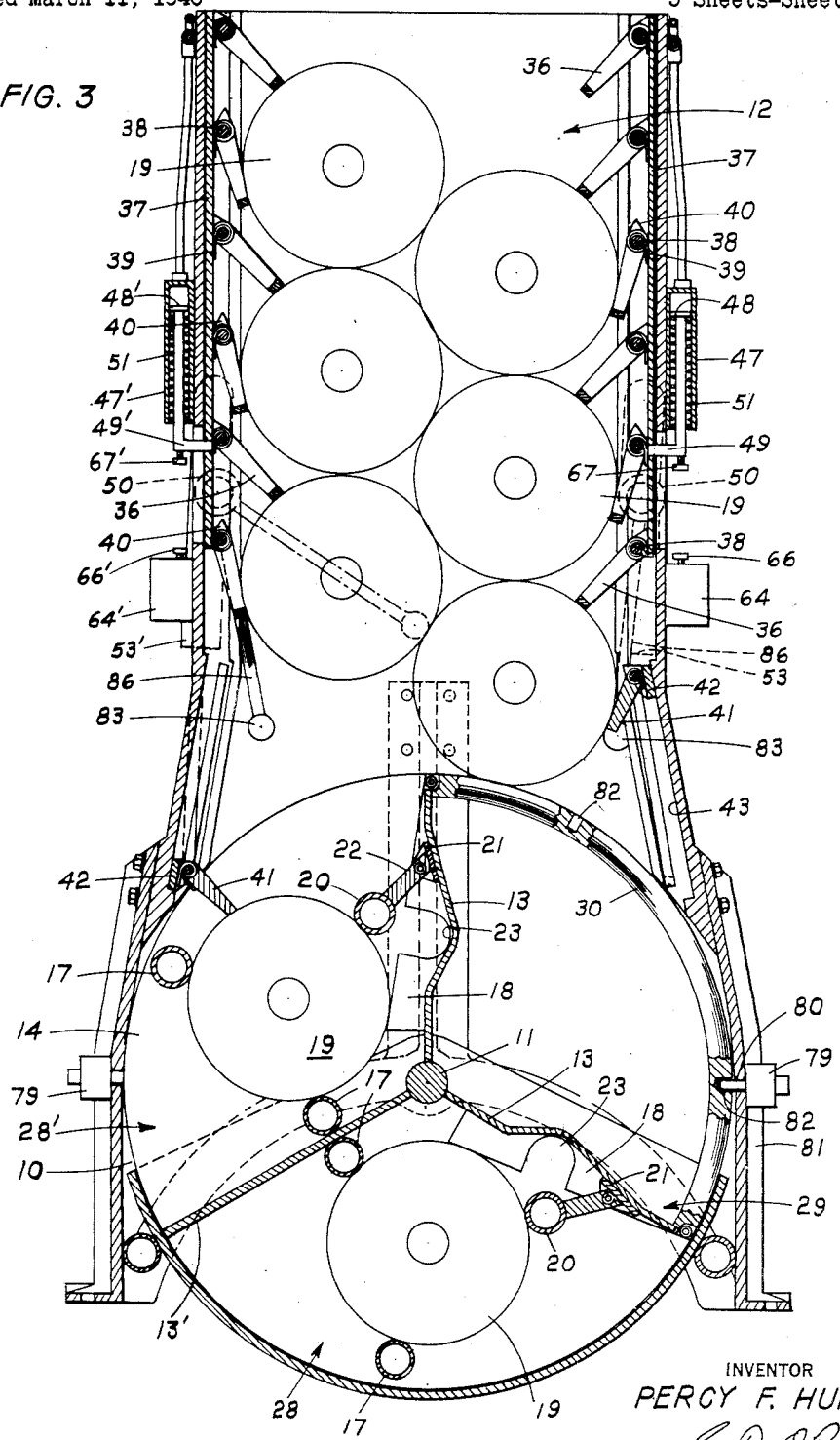

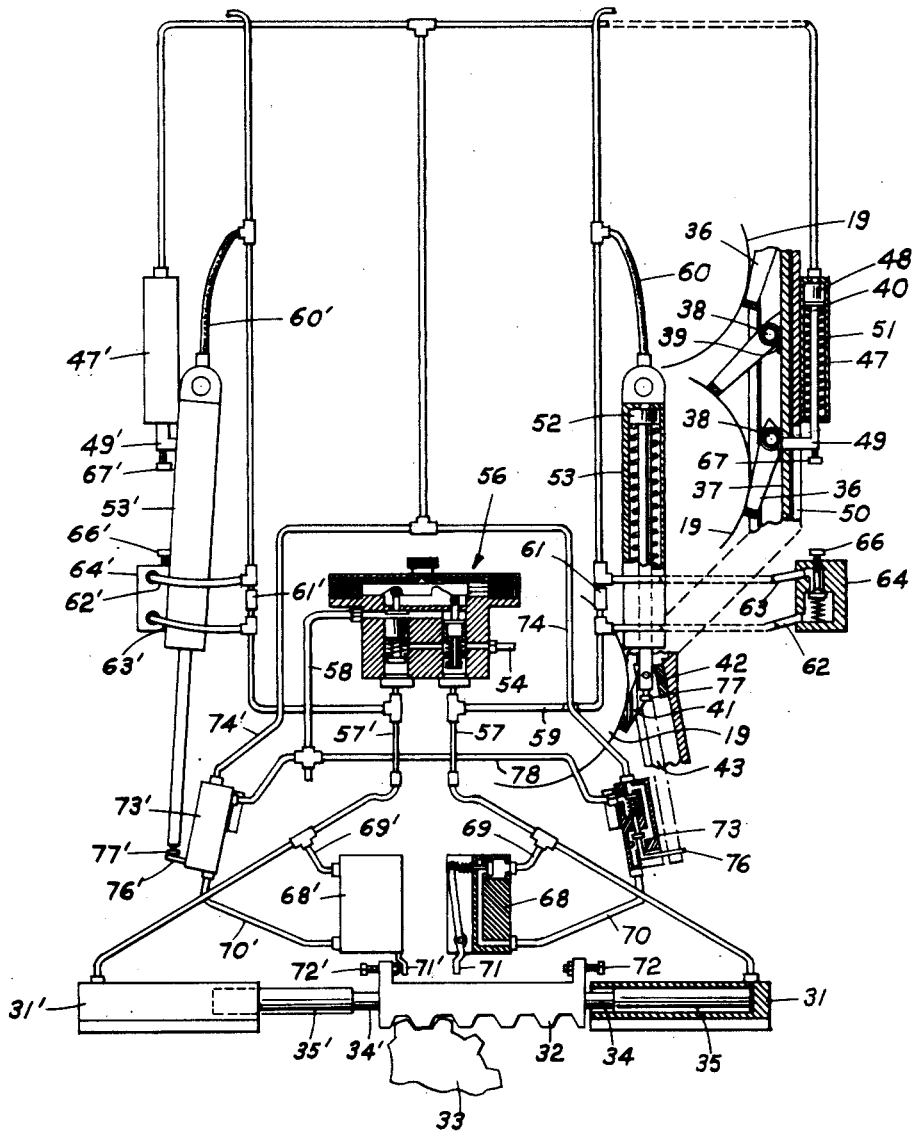

UNITED STATES PATENT OFFICE 2,599,555

AIRCRAFT ROCKET LAUNCHER

Percy F. Hurt, United States Navy, Washington, D. C., assignor to the United States of America as represented by the Secretary of the Navy Application March 11, 1946, Serial No. 653,693

7 Claims. (Cl. 89—1.7)

(Granted under the act of March 3, 1883, as amended April 30, 1928; 370 O. G. 757)

This invention relates to rocket launchers and particularly to devices adapted to launch rockets from aircraft.

An object of the invention is to provide a rocket launcher capable of automatic or semi-automatic operation and which will permit firing of a number of rockets in rapid succession.

Another object of the invention is to provide a rocket launcher for aircraft which may be reloaded in flight.

Still another object of the invention is the provision of a rocket launcher of light construction in which most of the component parts will not be required to be maintained between close mechanical tolerances.

In order that the invention may be clearly understood, reference is made to the accompanying specification and to the drawings in which there is illustrated one form of a rocket launcher made in accordance with the invention.

Fig. 1 is an end elevational view of a preferred embodiment of a rocket launcher of the present invention. The exhaust chamber is shown in section.

Fig. 2 is an isometric view of the rocket launcher illustrated in Fig. 1.

Fig. 3 is a cross-sectional view taken along line 3—3 of Fig. 2, and shows additionally the manner in which the rockets are accommodated in the magazine and firing cradle, the cradle being rocked from the position shown in Fig. 2.

Fig. 4 is similar to Fig. 3, but shows the firing cradle rotated through 120° from its position in Fig. 3, i. e. in the position shown in Fig. 2. In this view a rocket compartment is in loading position and receiving a rocket from the magazine.

Fig. 6 is a diagram illustrating the action of the transfer valves.

Figure 5:
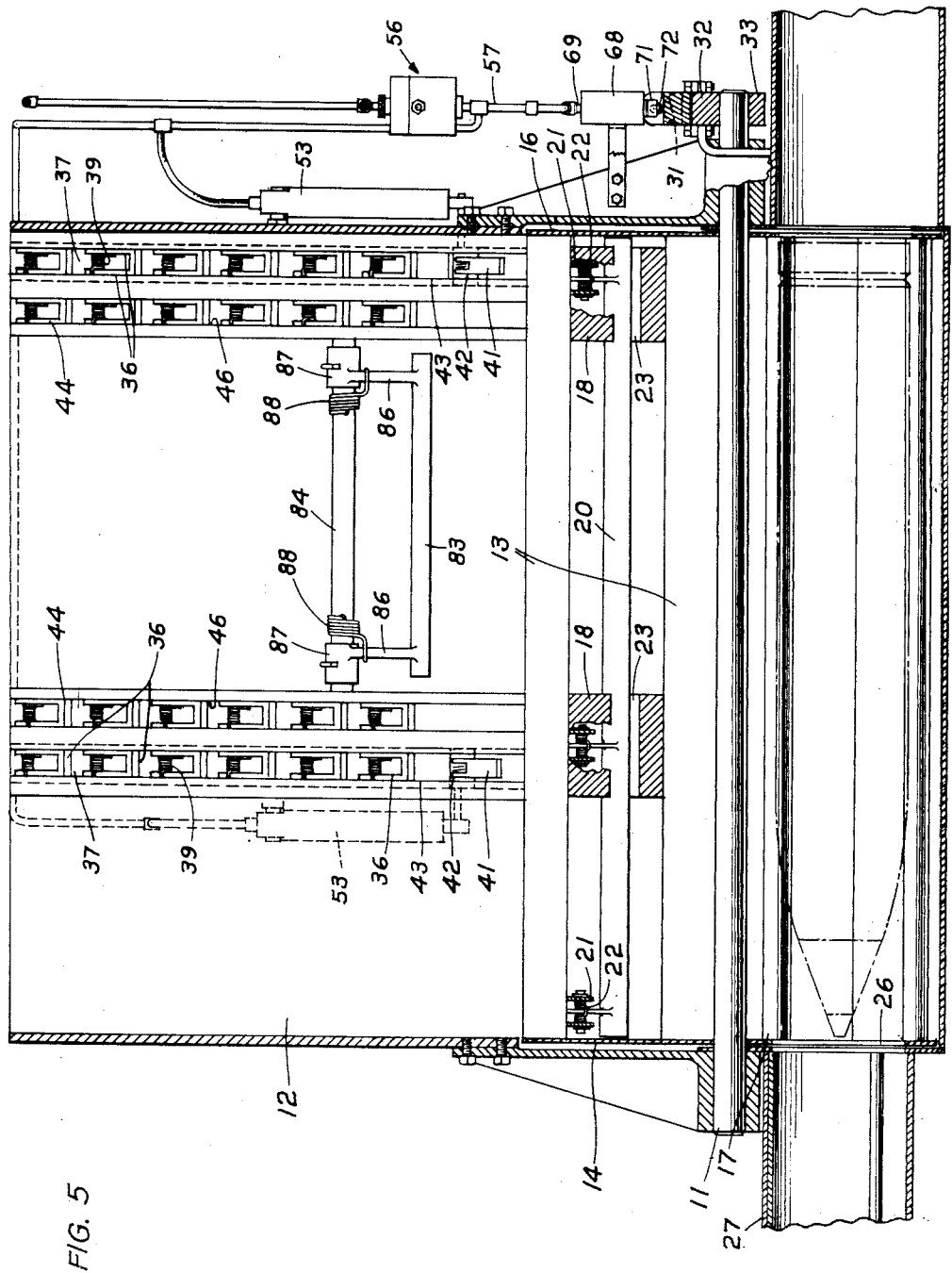
Fig. 5 is a longitudinal sectional view taken along line 5—5 of Fig. 2.

Referring now particularly to Figs. 1, 2, and 3, there is shown a firing cradle 10 pivotally mounted upon its axial shaft 11 adjacent a magazine 12. Cradle 10 is preferably of open construction and generally cylindrical in appearance, and its construction includes longitudinal partitions 13 and 13' fixed to shaft 11 and extending radially therefrom, and end-plates 14 and 16 which are fixed to the partitions by any convenient means, as by welding or brazing; rods 17 are fixed at their ends to the end-plates and are supported therebetween. Guide rails 18, fixed to partitions 13, guide the projectiles 19 as they enter the cradle 10 and assure proper positioning of the projectiles in the cradle. Movable rails 20, pivotally supported in brackets 21, are biased outwardly by springs 22, and serve as detents to prevent inadvertent withdrawal of a rocket from the cradle. Recesses 23 in guide rails 18 receive the rails 20 when they are depressed by a rocket in the cradle loading operation. Perforations 24 in end-plate 16 (rear) provide an escape for gases produced by combustion of the rocket propellant. End-plate 14 (forward) has two perforations 26 to permit passage of the rocket from the cradle to a barrel 27. The compartments 28 and 28' defined by partitions 13 and 13' have open sides and are adapted to receive projectiles and position them for firing, as stated above. Compartment 29, on the other hand, defined by the partitions 13 and a barrier rail 30, is not adapted to receive projectiles but to act as a switch in directing projectiles from the magazine alternately to the compartments 28 and 28'.

Oscillation of the cradle 10 is effected hydraulically through the agency of opposing cylinders 31, 31', a rack 32 and a quadrant 33 constantly meshed with the rack. Rack 32 is carried by a piston rod 34 intermediate the pistons, as 35, in the cylinders 31 and 31' and is movable in response to hydraulic pressure differentials between the cylinders.

Feeding the projectiles from the magazine to the firing cradle is accomplished in part by a number of pawls 36 carried by slides 37 in the magazine walls. The pawls 36 are mounted on pivots 38 and biased outwardly of the slides 37 by springs 39, the degree of outward rotation being limited as desired by projections 40 on the pawls. Pawls 41, carried in slides 42 and also biased outwardly of the slides, are the agency by which the projectiles are fed directly into the firing cradle (see Fig. 4). Slides 42 follow grooves 43 in the magazine walls.

A number of stationary pawls 44 carried in channels 46 in the magazine walls are pivotally mounted and biased outwardly of the channels in the same manner and to substantially the same degree as pawls 36.

The purpose of pawls 44 is to hold the projectiles in the advanced position to which they are moved by pawls 36, while the latter return past the projectiles to the position in which they will again be in feeding engagement with the projectiles.

Attached rigidly to the exterior walls of the magazine 12 are a number of hydraulic cylinders 47 containing pistons 48. Angular extensions 49 of the pistons are fixed to the slides 37, openings 50 in the magazine walls being provided for this purpose. Thus, movement of the slides 37 is dependent upon movement of the pistons 48 under hydraulic pressure or under the restoring force of springs 51. Similarly, pistons 52 of cylinders 53 control the movement of slides 42 to which they are pivotally attached.

The hydraulic system used to actuate the various piston described above may be served from any convenient pressure source (not shown) including the hydraulic system of the carrying craft. A line 54 from this pressure source conducts the fluid to a control valve 56, preferably electrically operated. The control valve has two working lines 57 and 57' and an exhaust line 58, and is designed to supply fluid pressure to only one at a time of the lines 57 and 57' while connecting the other to the exhaust line 58.

It will be seen that the hydraulic system contains two identical branches—one actuating the pistons, switches, and valves on the starboard side, the other actuating those on the port side. Therefore, for purposes of simplicity, only the starboard branch will be described, and it will be understood that the reference numerals assigned to the starboard branch will be primed and used to denote corresponding parts of the port branch.

One branch in line 57 is line 59 which is connected to cylinder 53 through a flexible pipe 60. Within line 59 is a check valve 61 to permit fluid flow only in the direction of valve 56. Lines 62 and 63 are connected to line 59 at opposite sides of the check valve 61 and are in turn connected to each other through valve 64. Valve 64 is normally closed but may be opened by depressing an exterior plunger 66 which is biased outwardly from the valve. An adjustable screw 67 on angular extension 49 is aligned with plunger 66 and adapted to depress it when piston 48 is extended.

Another valve 68 is connected to line 57 through line 69. Valve 68 is normally closed and therefore will not permit the flow of fluid from line 69 to line 70 until the lever 71 is actuated by an adjustable screw 72 carried by rack 32. A transfer valve 73 normally conducts fluid from line 70 to line 74 and thence to cylinder 47. However, when the lever 76 on valve 73 is depressed by an adjustable screw 77 on lower slide piston 42, fluid flow between lines 70 and 74 is stopped and line 74 is then connected with exhaust line 78. Transfer valve 73, among others, is illustrated in Fig. 6. The remaining length of line 57 supplies hydraulic pressure to the rack cylinder 31 as shown.

Solenoids 79, having plungers 80 and carried by a rigid portion 81 of the launcher structure are connected with an electrical operating switch by any convenient means (not shown) and, by engagement with recesses 82 in barrier rail 30, lock the firing cradle 10 in proper position for firing. Plunger 80 is so timed in the firing operation as to be withdrawn when the rotation of cradle 10 is pending.

A pair of movable rails 83 rotatably attached to shafts 84 by arms 86 and collars 87 are biased toward the center of the magazine by springs 88 and serve to retain the last projectile in proper alignment with the cradle for feeding thereinto. Rails 83 are retractable into the magazine walls when the magazine contains two or more projectiles.

Operation of the rocket launcher will be initiated by energizing, as by actuating a firing switch, the electrical circuit containing the electrically operated control valve 56. Simultaneously, the rocket in firing position (in compartment 28) is fired and solenoid plunger 80 is removed from recess 82. Operation of valve 56 conducts hydraulic fluid under pressure to one of the working lines, for example 57, the remaining working line 57' at the same time being connected with exhaust line 58. Pressure in starboard rack cylinder 31 forces rack 32 to the left, (see Fig. 1) rotating quadrant 33, shaft 11 and firing cradle 10 in a counterclockwise direction. Rocket compartment 28' is thus rotated to the position in which its rocket 19 is in alignment with the barrel 27, (see Fig. 4). At the same time, solenoid plunger 80 drops into recess 82 of the barrier rail 30 thereby preserving alignment of the firing cradle with the barrel until the rocket in the firing position is fired. Firing cradle 10 is thus brought into the position depicted in Fig. 4 in which the rocket compartment 28, now empty, is in the loading position adjacent magazine 12.

When the rack 32 approaches the end of its travel to the left, adjustable screw 72 engages the lever 71 of valve 68 thereby opening the valve. Hydraulic fluid under pressure is then permitted to pass through valve 68 and into line 70. Transfer valve 73 normally connects line 70 with line 74, and the pressure in line 70 is therefore transmitted directly to cylinder 47 to displace piston 48, against the pressure of spring 51, until adjustable screw 67 depresses plunger 66 of valve 64. Since the slide 37 is mechanically fixed to the angular extension 49 of piston 48, as previously described, the slide and the pawls 36 mounted thereto are displaced in the direction of the firing cradle causing the projectile adjacent the firing cradle partially to enter the latter. When the entering projectile is in this position, pawl 36 has reached the end of its feeding stroke and pawl 41 moves outwardly from its slide 42 under its spring bias into feeding engagement with the projectile. Depression of valve plunger 66 by contact with the adjustable screw 67 opens valve 64 permitting hydraulic fluid under pressure to pass through lines 59 and 62, valve 64, line 63 and flexible pipe 60 into cylinder 53 forcing piston 52, and therefore pawl 41, in a feeding direction by which the entering projectile is positioned snugly within the firing compartment 28. Dentent rail 20 is depressed against the biasing pressure of spring 22 into recess 23 by the entering projectile, but immediately the projectile has become seated between guide rail 18 and supporting rod 17, detent rail 20 swings out of its recess to engage the projectile and thereby to prevent inadvertent withdrawal thereof.

Upon reaching the limit of its feeding stroke the adjustable screw 77 on piston 52 displaces the lever 76 of transfer valve 73 closing the connection between lines 70 and 74 and opening the connection between line 74 and the exhaust line 78. This removes the hydraulic pressure from cylinder 47 and the piston 48 thereof is restored to its initial retracted position under the restoring force of spring 51 thereby forcing hydraulic fluid from cylinder 47 through line 74 and through the transfer valve 73 into exhaust line 78. With the removal of the pressure of adjustable screw 67 on valve plunger 66 the latter again moves into its closing position. When the launcher is next fired and line 57 is connected directly to the exhaust line 58 through valve 56, cylinder 53 is emptied by expansion of its spring behind piston 52.

The invention herein described may be manufactured and used by or for the Government of the United States of America for governmental purposes without the payment of any royalties thereon or therefor.

I claim:

1. A rocket launcher comprising a magazine for projectiles, a firing chamber pivotally mounted adjacent said magazine, means for imparting oscillatory motion to said firing chamber, feeding means including a carrier slidably mounted for reciprocating motion in the magazine, a first group of pawls pivotally mounted in said carrier, a slide carried by the magazine adjacent said firing chamber and movable from an initial position in the magazine to an advanced position within the firing chamber, and positioning means including a second group of pawls pivotally mounted on said slide; the combination of a first displacing means for moving said first group of pawls, a second displacing means for moving said second group of pawls, means for delaying operation of said second displacing means until said first displacing means has reached a predetermined position, and means operative when said second displacing means reaches a predetermined position to release said first displacing means for movement to its initial position.

2. In a rocket launcher the combination of a magazine for projectiles, a firing chamber pivotally mounted adjacent said magazine, a first feeding means for said projectiles including a carrier slidably mounted for reciprocating motion in the magazine, a first group of pawls pivotally mounted in said carrier, a slide carried by said magazine adjacent said firing chamber, a second feeding means for said projectile including a second group of pawls pivotally mounted on said slide, projectile retaining means including a third group of pawls pivotally mounted on a stationary portion of said magazine, a first displacing means for moving said first group of pawls, a second displacing means for moving said second group of pawls, means for delaying operation of said second displacing means until said first displacing means has reached a predetermined advanced position, means operative when said second displacing means reaches a predetermined advanced position to release said first displacing means for movement to its initial position, and means for imparting oscillatory motion to said firing chamber comprising a toothed quadrant fixed to one end of said firing chamber and coaxial therewith, a rack meshed with said quadrant, and displacing means for moving said rack laterally in said quadrant.

3. A rocket launcher in accordance with claim 2 in which means is provided to delay feeding operation of said first feeding means until said rack has reached a predetermined position with respect to said quadrant, whereby said firing chamber is properly positioned to receive a projectile from said magazine.

4. In a rocket launcher the combination of a magazine for projectiles, a firing chamber pivotally mounted adjacent said magazine, a first feeding means for said projectiles including pawls pivotally mounted in a carrier slidably mounted for reciprocating motion in the magazine, a first group of pawls pivotally mounted in said carrier, a slide carried by said magazine adjacent said firing chamber, a second feeding means for said projectiles including a second group of pawls pivotally mounted on said slide, projectile retaining means including a third group of pawls pivotally mounted on a stationary portion of said magazine, a first hydraulic displacing means for moving said first group of pawls, a second hydraulic displacing means for moving said second group of pawls, a first valve operable to prevent hydraulic pressure from reaching said second hydraulic displacing means until said first hydraulic dislacing means reaches a predetermined advanced position, a second valve, a third valve interposed between a source of hydraulic pressure and said second valve and normally closed to prevent hydraulic pressure from reaching said second valve, a toothed quadrant fixed to one end of said firing chamber and coaxial therewith, a rack meshed with said quadrant, and a third hydraulic displacing means for moving said rack laterally in said quadrant, said third valve being constructed and arranged to open when said rack reaches a predetermined advanced position whereby hydraulic fluid under pressure is conducted to said second valve, said second valve being constructed and arranged normally to connect said third valve with said first hydraulic displacing means but operable when said second hydraulic displacing means has reached a predetermined advanced position to connect said first hydraulic displacing means to hydraulic exhaust.

5. A rocket launcher comprising a magazine for containing a plurality of longitudinally superimposed projectiles, a firing chamber pivotally mounted about an axis parallel to the longitudinal alignment of said projectiles and adjacent said magazine, means for imparting oscillatory motion to said firing chamber, said firing chamber being divided longitudinally into a plurality of similar chambers for alternately receiving said projectiles from said magazine as each of said chambers moves between a loading position and a firing position, reciprocable conveyor means slidably mounted in said magazine for guiding and feeding said projectiles from the magazine to the firing chamber, said conveyor means including a carrier slidably mounted for reciprocating motion in the magazine, a first group of pawls pivotally mounted in said carrier, a second group of pawls pivotally mounted in a rigid portion of said magazine, a slide carried by the magazine adjacent said firing chamber and movable from an initial position in the magazine to an advanced position within the firing chamber, and a third group of pawls pivotally mounted on said slide all of said pawls being biased inwardly of said magazine for engagement with said projectiles but depressible to a position flush with the sides of the magazine, said first group of pawls being adapted to move the projectiles toward the firing chamber, said second group of pawls being adapted to hold the projectiles against counter-movement within the magazine, and said third group of pawls being adapted to conduct the projectiles from the magazine to a position of rest within the firing chamber.

6. A rocket launcher comprising a magazine for containing a plurality of longitudinally superimposed projectiles, a firing chamber comprising a cradle member of substantially open construction, end pieces for reinforcing the cradle, a pair of chambers adapted to alternately receive projectiles from said magazine as each of said chambers moves between a loading position and a firing position, a shaft extending longitudinally through the cradle and coaxial therewith and adapted pivotally to support the cradle adjacent the magazine, a plurality of radial partitions fixed to said shaft and to said end pieces to reinforce the cradle further and to define said chambers, a plurality of rods carried by said end pieces and longitudinally disposed in said chambers for positioning the projectiles in the chambers, a guide rail in each of said chambers carried by one of the adjacent partitions thereof for guiding projectiles entering the chambers, a pivotally mounted pawl on each of said adjacent partitions biased away from said adjacent partitions but depressible within a recess in said guide rails by a projectile entering the chamber, said pawls adapted to swing outwardly of the partitions to prevent withdrawal of a projectile carried by the firing chamber, means for imparting oscillatory motion to said firing chamber, said firing chamber being divided longitudinally into a plurality of similar chambers for alternately receiving said projectiles from said magazine as each of said chambers moves between a loading position and a firing position, and reciprocable conveyor means slidably mounted in said magazine for guiding and feeding said projectiles from the magazine to the firing chamber.

7. A rocket launcher comprising a magazine for containing a plurality of longitudinally superimposed projectiles, a firing chamber pivotally mounted about an axis parallel to the longitudinal alignment of said projectiles and adjacent said magazine, said firing chamber being divided longitudinally into a plurality of similar chambers for alternately receiving said projectiles from said magazine as each of said chambers moves between a loading position and a firing position, and reciprocable conveyor means slidably mounted in said magazine for guiding and feeding said projectiles from the magazine to the firing chamber, and means for imparting oscillatory motion to said firing chamber, said means comprising a toothed quadrant fixed to one end of said firing chamber, and coaxial therewith, a rack meshed with said quadrant, a rod extending from each end of said rack terminating in a piston, a cylinder for each piston fixed to a stationary portion of the rocket launcher structure, said cylinders being adapted alternately to receive hydraulic fluid pressure whereby the rack is caused to reciprocate between the cylinders and impart rotary motion to said quadrant.

PERCY F. HURT.

REFERENCES CITED

The following references are of record in the file of this patent:

UNITED STATES PATENTS

| Number | Name | Date |
|---|---|---|
| 6,945 | Perry | Dec. 11, 1849 |
| 353,676 | Gregg | Dec. 7, 1886 |
| 2,192,677 | Hoagland et al. | Mar. 5, 1940 |
| 2,366,684 | Garand | Jan. 2, 1945 |
| 2,440,634 | Henney | Apr. 27, 1948 |
| 2,440,723 | Macdonald | May 4, 1948 |

FOREIGN PATENTS

| Number | Country | Date |
|---|---|---|
| 20,275 | Great Britain | 1914 |
| 398,081 | Great Britain | Sept. 7, 1933 |